[11] 3,556,086

[72] Inventor Thomas E. Gordon
1410 N. Westmoreland Drive, Orlando, Fla. 32803
[21] Appl. No. 677,456
[22] Filed Oct. 23, 1967
[45] Patented Jan. 19, 1971

[54] ILLUMINATING STOMATOSCOPE
11 Claims, 11 Drawing Figs.
[52] U.S. Cl. ......................................... 128/22,
32/69; 240/4.2; 350/96
[51] Int. Cl. ....................................... A61b 1/06,
A61b 1/26
[50] Field of Search .......................................... 128/6—9,
11, 13, 16, 18, 22; 32/69, (Illum. Digest);
240/2.18, 4.2; 350/96, (Cursory)

[56] References Cited
UNITED STATES PATENTS

| | | | |
|---|---|---|---|
| 1,509,041 | 9/1924 | Hyams | 128/11 |
| 2,102,274 | 12/1937 | Larimore | 128/6 |
| 2,240,402 | 4/1941 | Joroslow | 128/6X |
| 2,843,112 | 7/1958 | Miller | 128/6 |
| 2,932,294 | 4/1960 | Fourestier et al. | 128/6 |
| 2,975,785 | 3/1961 | Sheldon | 128/6 |
| 3,244,167 | 4/1966 | Ferris et al. | 128/6 |
| 3,261,349 | 7/1966 | Wallace | 128/6 |
| 3,297,022 | 1/1967 | Wallace | 128/6 |
| 3,384,076 | 5/1968 | Speelman | 128/9 |
| 3,417,746 | 12/1968 | Moore et al. | 128/6 |
| 3,278,738 | 10/1966 | Clark | 350/211UX |

FOREIGN PATENTS
1,117,256  11/1961  Germany...................... 128/6

Primary Examiner—Dalton L. Truluck
Assistant Examiner—Kyle L. Howell
Attorney—Roger L. Martin ABSTRACT: A diagnostic instrument of the stomatoscope type has a body portion provided with a viewing passage. The lens assembly is housed in the body portion at the viewing end of the passage, and the body portion has an outer casing and an inner shell that are coaxially arranged and spaced apart at the object end of the passage to provide facing walls for housing the distal end portion of an optical fiber bundle that is arranged to provide an annular light-emitting surface at the object end of the passage. The bundle extends through a sidewall aperture in the casing, and the proximal end is housed in an attached hollow arm to which a handle carrying a light source is attachable. The casing walls are generally conical to facilitate orienting the fibers in the space by an air stream technique and the shell has a radial flange at its viewing end which seats against the inside casing wall during the process of assembling the body. The shell and casing are secured together along with the fibers by hardened plastic material that fills the space between the walls and apportions the hollow arm. The annular light-emitting surface is provided with a convex or conical contour that refracts emitted light toward the viewing axis and a mirror assembly for lateral vision and light reflection is rotatably adjustable about the viewing axis and detachably mounted on the body.

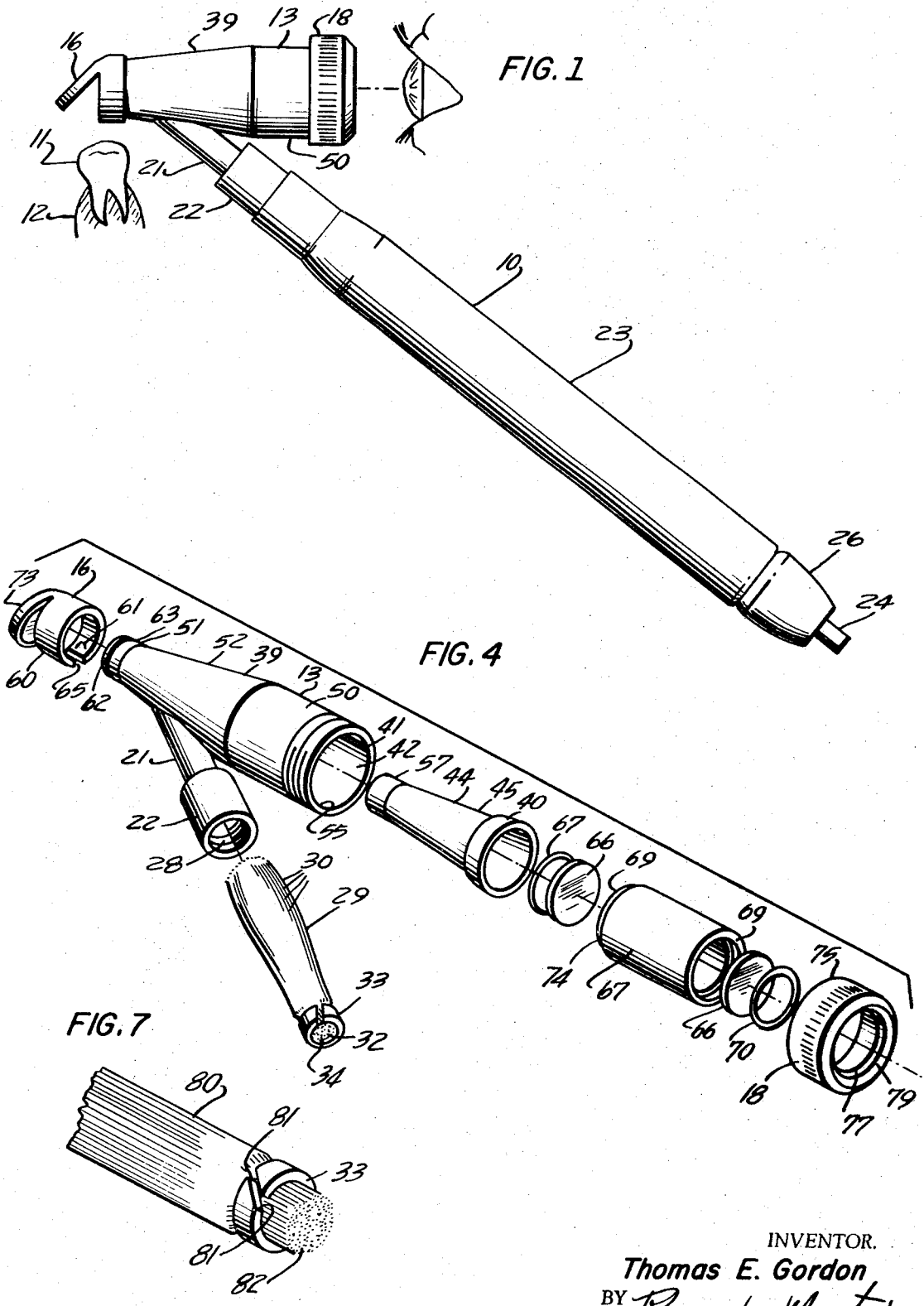

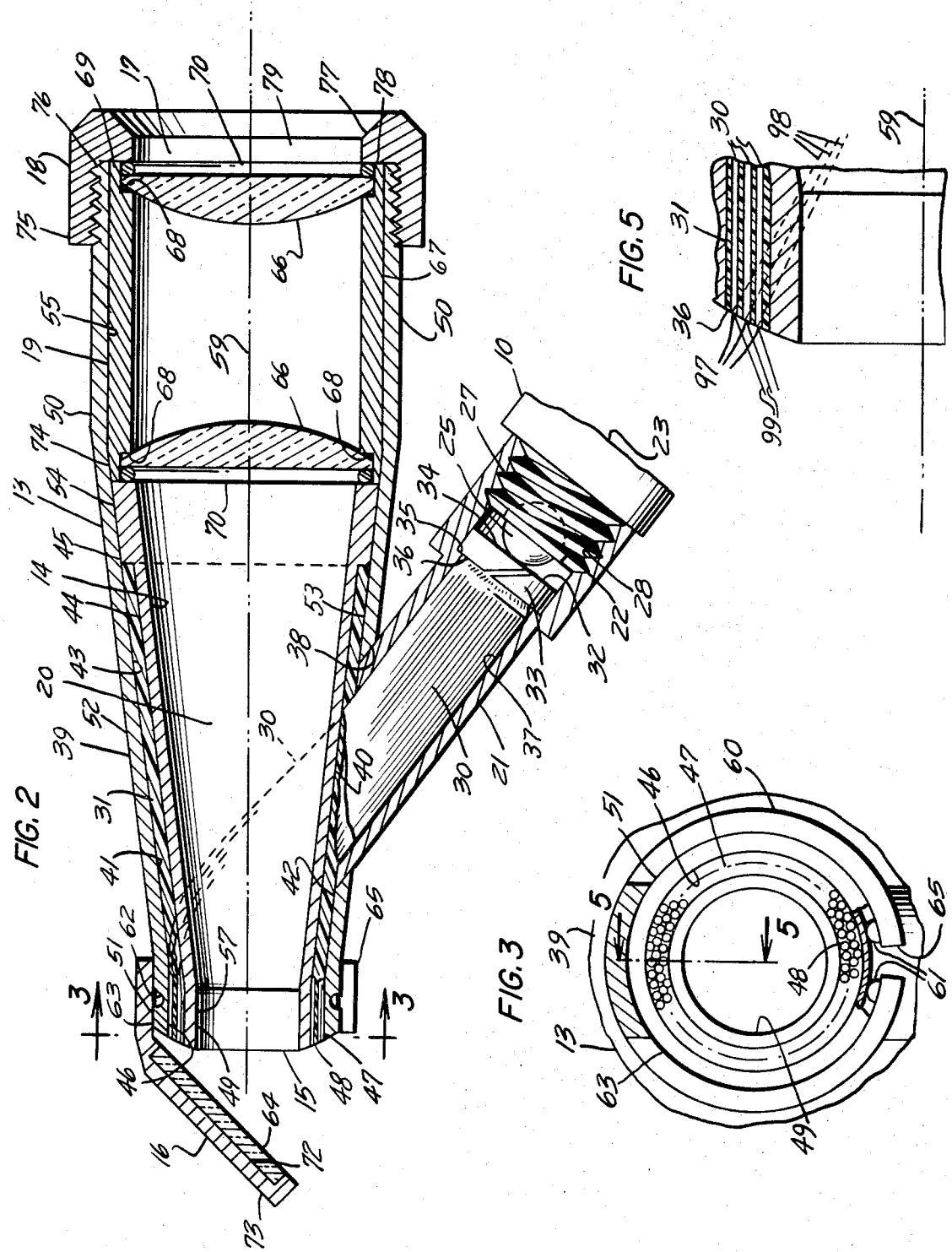

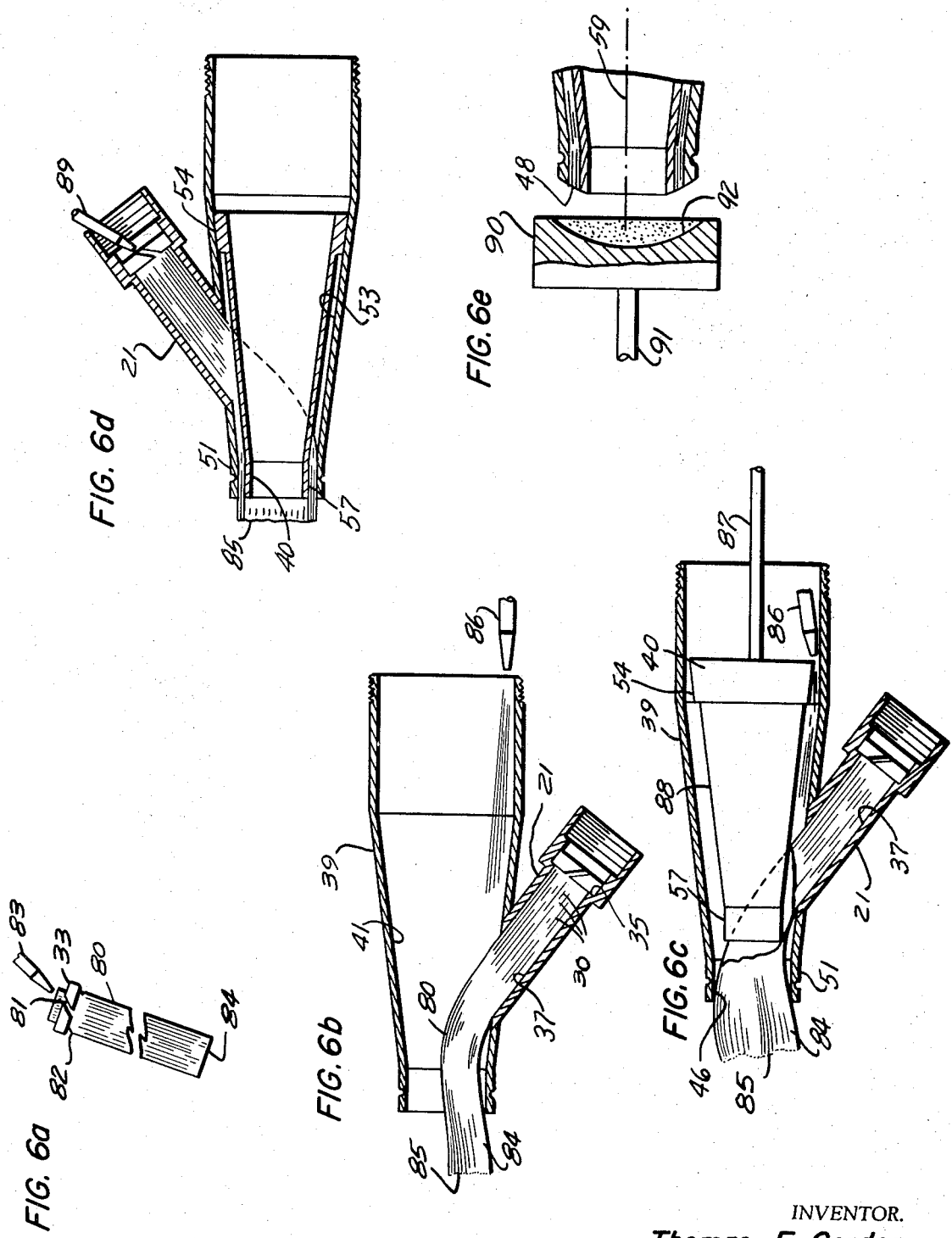

ILLUMINATING STOMATOSCOPE

BACKGROUND OF THE INVENTION

The invention relates to diagnostic instruments and in particular relates to improved instruments of the stomatoscope type that are used in dental work.

Diagnostic instruments for use in viewing various parts of the body are known and various different types of apparatuses have been advocated for use with such instruments to provide adequate illumination of the object in the field of view. In general the apparatuses previously advocated have been less than satisfactory and have frequently required the use of complex optical systems in order to adequately project the light into the field of view and without interference to the line of sight for the observer.

In recent years the use of optical fibers for transmitting light has become known and they are admirably suited for use in transmitting light from a remote source to the object end of a viewing passage in diagnostic instruments but experience has shown that the fibers are difficult to handle and properly orient in the manufacture of body members that have a viewing passage for observing the object. In most of such instruments it is usually desirable to orient the fibers in an annular fashion such that they surround the object end of the viewing passage and whereat they are adapted to provide an annular light-emitting surface. Such an arrangement has certain disadvantages in that a dead or nonilluminated zone results in the immediate frontal vicinity of the opening in the passage.

To date no satisfactory diagnostic instrument has been advocated for use in dental work and one reason for the lack of satisfaction lies in the fact that the means used for illuminating the field of view is usually unsatisfactory for both direct and indirect viewing of the object since a mirror must be used for indirectly observing the mouth area and for reflecting the light toward the object in much of the work encountered by dental diagnosticians. The problem of obtaining satisfactory illumination through the use of an annular light-emitting surface at the object end of a diagnostic instrument used in dental work is somewhat aggravated by the fact that the mirror must, in most instances, be positioned relatively close to the light-emitting surface and this of course frequently positions the mirror so far into the dead or nonilluminated zone at the object end of the passage as to render the illumination less than satisfactory.

SUMMARY

A general object of the invention is to provide an improved diagnostic instrument that employs a bundle of optical fibers for transmitting the light from a remote source to the object end of the viewing passage in the instrument.

One particular object is to provide a body portion for a diagnostic instrument and which involves structural features that greatly facilitate the handling and orientation of the fibers of an optical bundle in an arrangement that provides an annular light-emitting surface at the object end of the viewing passage.

Yet another object is to provide improvements which tend to reduce the size of the nonilluminated area encountered when annular light emission is employed.

Still a further object of the invention is to provide a stomatoscope which can be satisfactorily employed for both direct and indirect viewing of objects and which enables the dental diagnostician to quickly and easily replace the lens assembly when the need arises for a different degree of magnification.

In accord with one aspect of the invention the body member having the viewing passage in the instrument is made up of separate components that fit together during the manufacture of the member and in a manner such that optical fibers can be readily handled and oriented between the components during the manufacturing process to provide an annular light-emitting surface at the object end of the passage in the finished member. Yet another aspect of the invention involves providing the light-emitting end of the fiber bundle with a contour that causes the refraction of light toward the viewing end of the passage. A further aspect is directed to providing an annular light-emitting surface at the object end of the viewing passage in a stomatoscope and a mirror arrangement that provides a 360° field of indirect viewing to be realized and in an overall arrangement that permits quick and easy selection of the desired magnification by the diagnostician. Other aspects of the invention will become apparent from the detailed description which follows herein.

BRIEF DESCRIPTION OF THE DRAWINGS

A preferred embodiment of the invention in the form of a stomatoscope is shown in the accompanying sheets of drawings and wherein:

FIG. 1 is a side elevational view of the preferred embodiment, the embodiment being shown in the form of a stomatoscope posed for indirect viewing of a tooth in the mouth structure of a patient undergoing diagnostic observation;

FIG. 2 is an enlarged vertical section along the longitudinal axis of the body member of the instrument seen in FIG. 1 and also illustrates structure adjacent the body member;

FIG. 3 is an enlarged vertical transverse view looking at the object end of the body member with parts broken away, the view being generally along the lines 3—3 of FIG. 2;

FIG. 4 is an exploded view of certain parts of the instrument seen in FIG. 1;

FIG. 5 is an enlarged view of a fragment of the body member at the object end of the viewing passage and illustrates in vertical section the contour of the annular light-emitting surface at the distal end of the fiber bundle;

FIGS. 6A through 6E illustrate successive steps that are followed in assembling the body member and in adapting the distal end of the bundle for light emission; and FIG. 7 is an enlarged perspective view of one end of an optical bundle at one stage in the manufacture of the instrument.

DESCRIPTION OF PREFERRED EMBODIMENT

Reference is now made to FIGS. 1 through 4 wherein an instrument embodying certain concepts of the invention is shown in the form of a stomatoscope designated at 10. The stomatoscope 10 is shown in FIG. 1 in position for indirect viewing of a tooth 11 in the mouth 12 of a patient undergoing diagnostic observation.

The instrument 10 has an elongated hollow body member 13 which is provided with a viewing passage 14 that extends through the body. At the object end 15 of the passage 14, the instrument 10 is equipped with a mirror assembly, designated at 16. At the viewing end 17 of passage 14, the body carries a cap 18 which is threaded on the end of the body and which here serves to retain a lens assembly 19 in the hollow portion 20 of the body member. The body member or portion 13 of the instrument 10 is fixed to an elongated hollow arm or neck member 21 and on which the body portion 13 is supported during use of the instrument by the diagnostician. Arm member 21 is inclined to the longitudinal axis of the body and has an internally threaded cylindrical end section 22 at its lower end. Here the instrument 10 has an elongated hollow cylindrical casing member 23 which is screwed into the section 22 and which serves as a handle for use in manipulation of the instrument by the diagnostician. Casing 23 also serves as a housing for dry cell batteries, not shown, but which are connected in a suitable circuit with a plunger type switch 24 and a light bulb 25. The bulb 25, of course, serves as a source of light during use of the instrument. Switch 24 is mounted in an end cap 26 which is screwed on the lower end of the battery casing 23, and the cap is removable from the casing to facilitate the replacement of the batteries as the need arises.

The upper end of casing 23 has an externally threaded neck section 27 which engages the internal threads 28 of the rigid arm section when the instrument is fully assembled as seen in FIG. 2. Neck section 27 is hollow, and the light bulb 25 is located in the section as is evident from FIG. 2.

The light from bulb 25 is transmitted during use of the instrument to the object end of body 13 by a bundle 29 of optical light transmitting fibers 30 that are encased or embedded in a matrix of hardened plastic material, designated at 31 in FIG. 2. The fiber bundle and light source provide a means for illuminating an object at the object end of the viewing passage. The fibers 30 at one end 32 of bundle 29 are encircled by a split ring retainer element 33 which has a function to be described subsequently, and here, at this end 32, the bundle has a generally cylindrical configuration. In the manufacture of the instrument, the proximal end 32 of the bundle is adapted by grinding and polishing to provide a flat circular light-receiving surface 34 and which is arranged in the instrument in proximity to the light source 25 so as to receive the light therefrom.

Ring 33 is seated against a shoulder 35 that is located in the cylindrical section 22 of arm 21 and here at the proximal end 32 of the bundle, the fibers 30 extend through an end opening 36 in arm 21 and which communicates with the elongated hollow portion 37 of the arm. From opening 36, the fibers 30 extend through the hollow portion 37 and thence through an aperture 38 in the wall of the exterior casing component 39 of the body member. The body member 13 in addition to the elongated hollow exterior casing component 39 also has an elongated hollow shell component 40 which is arranged in the hollow 41 of the casing 39 as seen in the drawings. Within casing 39, the individual fibers 30 of bundle 29 are arranged to flair out from the aperture 38 toward the object end 15 of the viewing passage 14 and therebetween generally follow the contour of the inside wall 42 of the casing. The outside wall 45 of the shell has a tapered conical portion 44 which faces and is offset inwardly from the inside wall of the casing as seen in the drawings and the fibers 30 extend through the space 43 therebetween. The casing component has a circular opening 46 at the object end of the body and here at the distal end 47 of the bundle 29, the fibers 30 are located in the perimeter area of opening 46 and are oriented in parallel with the viewing axis between the inside casing wall 42 and the outside wall 45 of the shell.

The distal end 47 of the bundle is adapted by grinding and polishing to provide an annular surface 48 from which the transmitted light is emitted during use of the instrument. Surface 48 as will be noted in FIG. 3 is arranged to surround the shell opening 49 at the object end 15 of the viewing passage 14. As will be subsequently seen in accord with one aspect of the invention, surface 48 is preferably provided with a contour such that a line normal to the surface at any point therein will intersect the viewing axis 59 in back of the surface. With this type surface a prismatic effect results as the light is emitted at the ends of the fibers 30 and a greater portion of the emitted light is projected toward the axis in front of the opening as compared to situations where the surface 48 is planar.

The casing component of body 13 is preferably made of a suitable metal and has a cylindrical section 50 in which the lens assembly 19 is housed at the object end of the body. It also has a cylindrical tip section 51 at the viewing end of the body and which is of lesser diameter than section 50 as is evident from the drawings. Sections 50 and 51 are spaced apart in a coaxially arrangement at the opposite ends of an elongated tapering conical section designated at 52. Sections 50, 51 and 52 are integrally joined in the component 39 and the arrangement is such that the taper conical section 52 converges along the passage toward the opening 46 at the object end of the body. This section 52 accordingly provides a tapered conical portion 53 for the inside wall structure 42 and through which the aperture 38 communicates with the exterior of the casing and the internal space 43 between the shell and the casing in the hollow of the latter.

The outside wall 45 of shell 40 also has a tapered conical portion 44 which converges along the passage toward opening 49, and the arrangement is such between the outside conically tapered wall portion 44 and the inside tapered wall portion 53 of the casing that the fibers in the casing are housed in the annular zone or space 43 therebetween in the assembled body member. The optical fibers in the hollow portion of arm 21 and in zone 43 are encased or embedded in a matrix of hardened plastic material as previously indicated. Various different types of plastic materials may be used to fill the hollow 37 of the rigid arm and the tapering zone 43, as will be apparent to those skilled in the art, practically any one of the well-known acrylic resinous materials being admirably suitable for this purpose. The hardened resinous material of course rigidly secures the shell 40 to the casing component 39 and also serves to encase and bond the fibers together in the arrangement.

The shell 40 is housed in the casing in the assembled body portion 13 of the instrument, and it will be noted in FIG. 2 that shell 40 has a radially projecting annular flange 54 at the viewing end of the tapered shell portion 44. Flange 54 is also tapered to conform to the contour of the tapered inside wall portion 53 adjacent thereto so as to provide a snug fit between the perimeter of the flange and the inside wall portion 53 in the assembled body member. The inside wall 42 of the casing 39 also has a cylindrical portion 55 at the viewing end of the casing, and the flange 54, as will be noted in FIG. 2, is offset from this portion 55 toward the object end of the body in the fully assembled body portion. It will also be noted that the maximum diameter of the shell, as at the viewing end of flange 54, is of lesser diameter than the inside diameter of the cylindrical casing section 50 at the viewing end of the body. This arrangement is provided to enable the passage of an air stream into the annular space between the conical section 52 of the casing and the shell as the body components are being assembled and as will be subsequently evident.

Shell 40 has a cylindrical tip section 57 at the object end of the body and which defines the opening 49 at the object end of the passageway. Section 57 is of lesser diameter than the tip section 51 of the casing component, and the two sections 51 and 57 are so arranged that the fiber ends are here generally oriented in parallel with the viewing axis 59 along the passage.

The mirror assembly 16 includes a split ring member 60 which resiliently spreads apart at the slot 65 in the ring to provide a snug fit on the cylindrical tip section 51 of the casing 39 when the mirror assembly 16 is attached to the body portion of the instrument. The annular member 60 is provided with a pair of inwardly projecting protuberances 61 that serve as detents which fit in an annular exterior groove 62 in the exterior wall portion 63 of section 51 when the assembly is thus attached. The grooved arrangement for receiving the detents permits assembly 16 to be rotated about the viewing axis 59 by manipulating the member to overcome the friction encountered by the snug fit and thus to provide a 360° selection of the field of view through the mirror 64 while nevertheless retaining the assembly 16 on the body portion. The detent-groove arrangement is provided to prevent the assembly 16 from being dislodged accidentally from the end of the body during use by the diagnostician. The assembly 16 can be detached from body 15 to permit direct viewing by simply withdrawing the assembly 16 with a force sufficient to cause the ends of the ring to spread apart at the slot 65 and thus to withdraw the detents from the groove 62. The mirror 64 per se is distally offset from the passage opening 49 at the object end of the body and is secured by a suitable adhesive in a facial recess 72 in a flat circular rigid plate 73 that is in turn fixed along one edge to the split ring member 60 of the assembly 16 as seen in the drawings. Plate 73, as seen in FIG. 2, is angularly arranged with respect to ring 60 and this, in turn, provides an angular arrangement of the mirror 64 with respect to the viewing axis 59 when the assembly 16 is attached to the body portion 13 of the instrument. Various other methods for detachably mounting a mirror at the viewing end of the passage will occur to those skilled in the art.

The lens assembly 19 is housed in the casing 36 at the viewing end of the body 13 and is surrounded by the cylindrical portion 55 of casing wall 42. Assembly 19 includes a pair of planoconvex optical lens 66 in the embodiment illustrated, and these lens 66 are spaced apart and supported in the assembly at the opposite ends of a hollow cylindrical spacer 67 which is adapted to fit in the section 50. Spacer 67 is provided with internal annular shoulders 68 at its opposite ends and the lens 66 are retained against the shoulders by conventional split ring retainers 70 that are compressed to fit in the opposite ends of the cylindrical spacing element 67 as seen in the drawings. The object end of spacer 67 has a tapered annular section 74 which is formed integral therewith and which abuts the viewing end of the shell as seen in FIG. 2. The section 74 is tapered to accommodate the contour of the inside casing wall at the viewing end of the tapered conical portion 53 and aids in establishing the location of the assembly 19 in the casing. The cap 18 at the viewing end of body portion 13 is provided with an internally threaded cylindrical collar 75 which engages the externally threaded end of the casing thereat. Cap 18 has an inwardly projecting annular flange 77 which projects into the perimeter area of the circular opening 78 at the viewing end of passage 14, and there flange 77 serves to retain the lens assembly 19 in the casing through contact with the viewing end of the lens spacer. The flanged cap of course is provided with an appropriate circular opening 79 which is arranged concentrically to the viewing axis 59 to facilitate the viewing arrangement. By simply unscrewing the cap to detach it from the casing, assembly 19 can be readily withdrawn from section 50 through opening 78 and replaced with a similar lens assembly that provides a different degree of magnification. The arrangement accordingly enables quick and easy access to the lens assembly to facilitate its replacement by the diagnostician.

Among the advantages realized by using the shell and casing components in the body structure is the ease with which the fibers may be oriented and arranged therebetween to provide a suitable annular fiber arrangement at the object end of the passage, during the manufacture of the diagnostic instrument. In addition, the shell and casing components 39 and 40 serve as forms or molds in which the plastic matrix 31 for the fibers is cast and become permanent fiber protecting structural components of the finished body member.

The process of assembling the body portion of the instrument is illustrated diagrammatically in FIGS. 6A through 6E. The casing 39 and shell 40 components are of course fabricated in accord with conventional manufacturing procedures, and the rigid neck or arm portion 21 of the instrument is welded to the casing 39 so that the aperture in the tapered casing section communicates with the hollow 37 of the arm 21.

In handling the loose fibers in preparation for their installation in the casing 39, the fibers 30 are first gathered in a bundle of sufficient length and size for the contemplated use and the fibers are clamped together by the split ring retaining element 33 at one end of the bundle, the resilient retainer 33 of course being spread apart to insert the end of the bundle and thereafter released to clamp the fibers together at the bundle end. Under such circumstances, the fibers 30 throughout the remaining length of the bundle are loosely associated in an arrangement where they are generally in parallel as indicated by the elongated bundle of loose fibers designated at 80 in FIG. 6A. The ends 81 of the resilient split ring on bundle 80 at this stage are spread apart as seen in FIG. 7 and as also seen in this FIG., the confronting ends of the ring 81 are cut at an angle to the generally parallel arrangement of the fibers at this end 82 of the bundle so that the fibers are unable to slip through the space between ends 81 in the clamp-type device. After the fibers are clamped together by retainer 33, a small amount of hardenable plastic material is placed on the end 82 of bundle 80 as by means of an eye dropper 83 shown in FIG. 6A. This small amount of plastic material passes into the interstices between the fibers at this end 82 of the bundle 80 and is permitted to cure or harden to securely fix the fibers together while nevertheless permitting the fibers to remain loosely associated throughout the remaining length of the bundle. Once the plastic material has hardened, the end 82 of the bundle 80 is then ground to provide a suitable light receiving surface for ultimate use in the instrument.

Once the proximal end 82 has been suitably adapted for light reception, the bundle 80 is arranged so that the loose fibers extend through the arm 21 and the hollow casing area between the aperture 38 and opening 46 with the loose ends 85 of the fibers at the distal end 84 of the bundle disposed externally of the casing 39 as seen in FIG. 6B. This may be accomplished in various ways but is preferably done by passing a jet of gas through the hollow 41 as from the nozzle indicated at 86 and by directing the gas stream across the aperture 38 to create a reduced pressure condition at the aperture end of arm 21. This of course causes air flow through the hollow 37 of arm 21 and into the casing, and can be used to entrain the loose ends 85 of the fibers and to thus draw the ends through the arm and ultimately to the position shown in FIG. 6B. At this point it will be noted that ring 33 encounters the shoulder 35 at the opening 36 in the arm 21.

With the bundle 80 in the position shown in FIG. 6B, the shell 40 is next passed, tip end first, through the opening 78 at the viewing end of the casing 39. This may be accomplished by carrying the shell 40 at the end of a suitable holding device 87 which can be released from the shell once the latter is in its proper place in the casing and by manipulating device 87 to pass the shell 40 through the opening 78 and into the casing 39. As the shell 40 is passed into the casing 39, the location of the loose fibers in the hollow 41 of the casing is gradually confined to an annular tapering zone 88 between the inside wall 42 of the casing and the outside wall portion 44 of the shell. As the location of the loose fibers is thus being confined by passing the shell into the casing, a stream of fiber entraining gas such as an air stream from nozzle 86 is passed between the casing and the shell through zone 88, the stream being directed in the direction of the object end opening 46 in the casing and across the aperture 38. Flange 54 of shell 40, as previously noted, is of lesser diameter than the diameter of the inside cylindrical wall portion 55 to enable a space to be provided between the flange and wall portion for passing the stream into the zone as the shell is manipulated into place. The stream of air serves to entrain the fibers in the annular zone 88 as the shell is being inserted and causes them to generally orient themselves along the inside wall of the casing in a flaring, generally parallel fiber arrangement in the zone 88 with the ultimate result that at the casing opening 46, the loose fibers become oriented in parallel with the viewing axis in the perimeter area of the casing opening 46 as the shell becomes fully seated in the casing and traps the fiber ends in the space between the cylindrical tip sections 51 and 57.

When the shell is fully seated in the casing with the flange 54 in contact with the tapered wall portion 53, the hollow of the arm 21 and resulting zone 88 are filled with hardenable plastic material which is then permitted to cure to fully encase the fibers in these areas of the instrument. The shoulder 35 and retainer ring at the proximal end of the bundle are so adapted in the arrangement that the slot between ends 81 communicates with the hollow of the arm 21. Hence the uncured plastic material may be inserted through the space between the ends 81 of the split ring 33 by means of a syringe-type device having a hollow needle 89 as depicted in FIG. 6D. The body is preferably inverted as seen in FIG. 6D as the uncured plastic material is forced into the hollow and from whence the material flows to fill the body zone 88. Once the plastic material is cured, the distal end of the bundle can be adapted by suitable grinding and polishing procedures to provide the desired annular light-emitting surface configuration.

In accord with one aspect of the invention, the distal end of the bundle is provided with a finished surface 48 such that the light emitted at the ends of the fibers is in general refracted toward the viewing axis 59 in front of the surface. As will be apparent to those skilled in the art, when the distal end of the bundle is ground to provide a planar surface which is perpendicular to the viewing axis 59, the light emitted at the end of each fiber 30 is scattered in a diverging, generally conical path which is parallel to the fiber axis. Consequently, when the fibers at the distal end of the bundle are arranged in parallel with the viewing axis and so oriented as to provide an annular light-emitting surface that surrounds the viewing passage, there is a conical zone immediately in front of the object end of the passage and which is not directly illuminated by light emitted from the fiber ends. To reduce the distance that the conical zone extends along the viewing axis in front of the light-emitting surface and in accord with this aspect of the invention, the distal end of the bundle is provided with a surface that generally refracts the emitted light toward the viewing axis of the passage. The distal end of the bundle may be ground to various contours that will provide such refraction. For example, the surface may take the form of a truncated conical surface generated for example by rotating about the viewing axis a straight line that is inclined to and intersects the viewing axis in front of the surface. Yet other surfaces which will cause such refraction are the various convex surfaces that are symmetrical with respect to the viewing axis and which may be generated by rotating circular or elliptical line segments about the viewing axis. All of such surfaces have in common the fact that a line normal to the surface at any point on the surface intersects the viewing axis in back of the surface. In practice it has been found that by grinding the bundle end to provide an annular light-emitting surface which is convex and spherically contoured satisfactory reduction in size of the nonilluminated conical zone can be realized for practical purposes.

Thus in finishing the body member to provide the desired surface a suitable grinding tool 90 having a spherical grinding surface portion 92 is centered on the axis 59 and rotated with respect to the axis 59 of the body member, as on a coaxially arranged spindle 91, and the object end of the body is brought axially into contact with the surface 92 to impart the desired contour to the distal end of the bundle 80.

The resulting surface is best seen by reference to the fragment of the body portion shown in FIG. 5 and wherein it will be evident that both the curvature of the annular surface 48 and the size of the fibers 30 are exaggerated for illustration purposes. Here it will be noted that the surface 48 is convex and that the imaginary lines 98 normal to the surface at the various points of intersection with the surface 48 in the meridian of the sectional view shown will intersect the viewing axis 59 in back of the surface. With this surface 48 arrangement light being transmitted along the respective axes of the fiber 30 will be generally refracted toward the viewing axis 59 in front of the surface 48 as indicated by the center lines 99 of the generally conical paths of the light emitted from the respective fibers.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

I claim:

1. A diagnostic instrument comprising a body portion having a viewing passage, and illuminating means for illuminating an object at the object end of the passage; said body portion including a hollow casing that surrounds the passage, and a hollow shell that surrounds the passage and is housed in the casing; said casing having an inside wall portion and an opening for the passage at the object end of the casing, said inside wall portion having a tapered wall portion that converges along the passage toward said opening, said shell having an outside wall portion which faces said tapered wall portion and which is spaced apart therefrom at the object end of the passage, said shell having a radially projecting flange which is located at the viewing end of the tapered wall portion and which thereat snugly fits against said inside wall portion, said casing having an aperture which is located between said flange and said opening and which communicates with the space between said tapered wall portion and said outside wall portion, said illuminating means including a light source located at the exterior of the casing, and a light-transmitting fiber bundle which extends through the aperture and has a proximal end and a distal end, the proximal end of said bundle having a light receptive surface and being arranged to receive light from said source, the distal end of said bundle being located in said space and having an annular light-emitting surface that surrounds the object end of the passage, and said instrument further comprising hardened plastic means which is located in said space and which bonds the fibers together and secures the shell to the casing.

2. A diagnostic instrument in accord with claim 1 where said tapered wall portion is generally conical in shape, where said inside wall portion has a cylindrical wall portion at the viewing end of said tapered wall portion, where said flange has a diameter that is less than that of said cylindrical wall portion, and where said flange is offset from said cylindrical portion and in contact with said tapered wall portion.

3. A diagnostic instrument in accord with claim 1 where said outside wall portion convergingly tapers along the passage toward said opening, and where said flange snugly fits against said tapered wall portion of said inside wall portion.

4. A diagnostic instrument in accord with claim 1 where said outside wall portion convergingly tapers along the passage toward said opening, where said tapered wall portion is generally conical in shape, where said inside wall portion has a cylindrical wall portion at the viewing end of said tapered wall portion, where said flange has a diameter that is less than that of said cylindrical wall portion, where said flange is offset from said cylindrical portion and in contact with said tapered wall portion, and where the instrument further comprises lens means housed in said casing and surrounded by said cylindrical wall portion.

5. A diagnostic instrument in accord with claim 1 where said casing has a cylindrical tip portion at the object end of the passage, where the instrument further comprises a mirror which is arranged at an angle to the viewing axis of the passage and which is located in front of the annular light-emitting surface, and means carrying the mirror which is detachably mounted on said tip portion and adjustably rotatable about the viewing axis, and where said annular light-emitting surface is a convex surface.

6. A diagnostic instrument in accord with claim 1 where said outside wall portion convergingly tapers along the passage toward said opening, where said tapered wall portion is generally conical in shape, where said inside wall portion has a cylindrical wall portion at the viewing end of said tapered wall portion, where said flange has a diameter that is less than that of said cylindrical wall portion, where said flange is offset from said cylindrical wall portion and in contact with said tapered wall portion, where said casing has a cylindrical tip portion that defines said opening, where the instrument further comprises a mirror which is arranged at an angle to the viewing axis of the passage and which is located in front of the annular light-emitting surface; means carrying the mirror which is detachably mounted on said tip portion and adjustably rotatable about the viewing axis of the passage, and lens means housed in said casing and surrounded by said cylindrical wall portion, and where said annular light-emitting surface is a convex surface.

7. A stomatoscope comprising a body portion which has a viewing passage and exterior openings respectively located at the viewing and object ends of the passage, illuminating means for illuminating an object at the object end of the passage, a lens assembly for magnifying an object viewed through the passage, a rigid arm fixed to the body portion, a mirror, and means supporting the mirror and mounted on the body portion at the object end of the passage; said body portion comprising a hollow casing that surrounds the passage and includes a cylindrical section which surrounds and houses the lens assembly at the viewing end of said passage, and a conical section which is integral with the cylindrical section and arranged to converge along the viewing axis of the passage toward the opening at the object end of the passage, said conical section having an inside wall portion and an aperture which is offset toward the viewing end of the passage from the opening at the object end of the passage, said arm having a hollow that communicates with the interior of the casing through said aperture, said illuminating means comprising a light source exteriorly of the body portion, and a light transmitting fiber bundle which extends through the aperture and has a proximal end and a distal end, said proximal end having a light-receptive surface and being arranged in the hollow of the arm to receive light from said source, said distal end being located in the interior of said casing and having an annular light-emitting surface that surrounds the object end of the passage, the fibers of said bundle being arranged so that the fiber portions in the interior of the casing flare out from the aperture toward the opening at the object end of the passage and therebetween follow the contour of said inside wall portion, said lens assembly being removable from the cylindrical section through the opening at the viewing end of the passage, said stomatoscope further comprising hardened plastic means encasing the fibers in the hollow of said arm and fixing said fibers to said inside wall portion, and a cap retaining the lens assembly in the cylindrical section and being releasably secured to the cylindrical section, said mirror being located in front of the light-emitting surface and angularly arranged with respect to the viewing axis of the passage, and the supporting means for the mirror being detachably mounted on the casing and rotatably adjustable about the viewing axis of the passage.

8. A stomatoscope in accord with claim 7 where said body portion further comprises hollow tapered means housed in the casing and therewith defining an annular conical space which surrounds the passage, where the fiber portions in the interior of the casing are housed in the annular conical space and where said space is filled with said hardened plastic means.

9. A stomatoscope in accord with claim 7 where said rigid arm has shoulder means in the hollow thereof and an adjacent opening to the exterior of the body portion, where said stomatoscope further comprises annular clamping means which surrounds the fibers at the proximal end of the bundle and which is arranged in contact with said shoulder means, and means releasably connected to the arm at the arm opening and supporting the light source adjacent to the light receptive surface of the bundle.

10. A stomatoscope in accord with claim 7 wherein the annular light-emitting surface is characterized at any point thereon by an imaginary line normal to the surface which intersects the viewing axis in back of the light-emitting surface.

11. A stomatoscope in accord with claim 7 wherein said casing has a cylindrical tip section which surrounds the opening at the object end of the passage and which is integral with the conical section of said casing, and where the mirror-supporting means comprises annular means encircling the cylindrical tip section and carrying said mirror, said annular means being rotatably movable on said tip section to rotatably adjust the mirror about the viewing axis of the passage, and said annular means having means engaging said casing to retain said annular means on said tip section and being disengageable therefrom to permit removal of said annular means from said tip section.